United States Patent
Kesseli et al.

(10) Patent No.: US 7,393,179 B1
(45) Date of Patent: Jul. 1, 2008

(54) VARIABLE POSITION TURBINE NOZZLE

(75) Inventors: James B. Kesseli, Greenland, NH (US);
Ward H. Robinson, Newton, NH (US);
Antoine H. Corbeil, Gatineau (CA)

(73) Assignee: Brayton Energy, LLC, Hampton, NH (US)

( * ) Notice: Subject to any disclaimer, the term of this patent is extended or adjusted under 35 U.S.C. 154(b) by 623 days.

(21) Appl. No.: 11/103,961

(22) Filed: Apr. 12, 2005

Related U.S. Application Data

(60) Provisional application No. 60/561,567, filed on Apr. 13, 2004.

(51) Int. Cl.
*F01D 17/16* (2006.01)
(52) U.S. Cl. .................. 415/162; 415/163; 415/164; 415/165; 415/48; 415/126; 415/209.3
(58) Field of Classification Search .............. 415/126, 415/163, 164, 165, 167, 48, 209.3, 209.4
See application file for complete search history.

(56) References Cited

U.S. PATENT DOCUMENTS

| | | | |
|---|---|---|---|
| 4,048,012 A | 9/1977 | George et al. | |
| 4,385,864 A * | 5/1983 | Zacherl | 415/136 |
| 4,414,805 A | 11/1983 | Walker | |
| 4,942,736 A | 7/1990 | Bronicki | |
| 4,984,965 A * | 1/1991 | McKean | 415/155 |
| 5,183,381 A * | 2/1993 | McKean | 415/150 |
| 5,448,889 A | 9/1995 | Bronicki | |
| 5,537,822 A | 7/1996 | Shnaid et al. | |
| 5,628,191 A | 5/1997 | Kueck et al. | |
| 7,325,401 B1 | 2/2008 | Kesseli et al. | |

* cited by examiner

*Primary Examiner*—Ninh H Nguyen
(74) *Attorney, Agent, or Firm*—McLane, Graf, Raulerson & Middleton, P.A.; Scott C. Rand

(57) ABSTRACT

An apparatus and method are provided for permitting free rotation of turbine nozzle vanes, while minimizing or eliminating leakage on the vane side-walls. The device incorporates a plurality of nozzle vanes arranged around the circumference of a radial or mixed inflow turbine. Each of the nozzles is individually attached to a rod positioned perpendicular to the flow direction. The nozzle rods in the circumferential array protrude through a movable annular back-wall, and are rotated by a linkage or gear. Between discrete movements of the vane mechanism, a bellows device is used to provide pressure-actuated force in the movable back-wall, thereby clamping the nozzle between the two surfaces. Prior to rotating the nozzles, pressure within the bellows interior is decreased via venting to cause a retraction of the back wall.

16 Claims, 9 Drawing Sheets

VARIABLE POSITION TURBINE NOZZLE

CROSS REFERENCE TO RELATED APPLICATION

This application claims the benefit under 35 U.S.C. § 119 (e) of U.S. provisional application Ser. No. 60/561,567, filed Apr. 13, 2004. The aforementioned provisional application is incorporated herein by reference in its entirety.

FIELD OF THE INVENTION

The present invention relates generally to the field of turbomachinery and, more specifically, to an apparatus and method for the control of gas entering a radial inflow or mixed flow turbine.

BACKGROUND OF THE INVENTION

A radial turbine is a practical device for converting gas pressure and temperature to shaft power. The majority of radial turbines incorporate fixed geometry nozzle vanes, or airfoils, to optimally guide the gas entering the rotor. In such cases the principal flow parameters, such as pressure, mass flow rate, and temperature, remain in fixed proportion, and cannot be individually controlled. The variable area nozzle provides an additional degree of control freedom, permitting independent control over inlet temperature, pressure, and flow through the turbine stage. Many examples of variable area nozzles have been deployed on such products as hover craft and turbochargers.

Most practical variable area nozzles incorporate a mechanism to rotate the nozzle vane. This is particularly critical for gas turbines where the inlet gas temperature is typically in the range from about 1000 degrees F. to 2500 degrees F. Changing the stagger angle alters the throat between nozzle vanes and changes the flow angle entering the rotor. To permit free rotation of the common variable position nozzle, clearance between the nozzle back-wall and the shroud line, or static turbine structure, is required. This clearance represents a performance loss as a percentage of the air entering the rotor will flow beneath or over top of the nozzle vane with a largely radial trajectory. This flow vector is not optimal for work extraction within the rotor, and generally contributes to inefficiency within the turbine stage.

SUMMARY OF THE INVENTION

The present invention provides an improved variable position turbine nozzle apparatus and method, which permit free rotation of turbine nozzle vanes, while minimizing or elimination leakage above and below the vane. The present development incorporates a plurality of nozzle vanes arranged around the circumference of a radial inflow turbine. The nozzles are individually attached to a rod positioned perpendicular to the flow direction. The array of circumferential nozzle rods protrudes through a movable annular back-wall. In a preferred embodiment, a linkage or gear connects the plurality of rods to allow simultaneous rotation of all nozzles for opening and closing the passage between nozzle vanes, although other means for positioning the vanes are also contemplated. Clearance may be provided between the movable back-wall, the rotatable nozzle vane, and the fixed turbine shroud, such that, by retracting the back-wall in the axial direction, the nozzle is free to rotate without friction or interference with the shroud or back-wall. In the full forward position, the movable back-wall closes the gaps on either side of the nozzle. One or more bellows devices may be used to provide pressure-actuated force in the movable back-wall, thereby clamping the nozzle between the two surfaces. With these general features, the complete apparatus may be capable of discrete steps with free angular movement, followed by periods of clamped fixed geometry operation. The apparatus is well-suited for applications that tolerate momentary nozzle vane leakage, followed by extended operation at fixed geometry conditions. When the nozzle is fixed by the clamping pressure of the bellows, the aerodynamic performance of the vane is equal to the fixed geometry, non-leaking nozzle.

The loads on the turbine structural components may also be balanced in a turbomachine employing the variable position nozzle vanes in accordance with this teaching. Evaluation of the natural loads within the turbomachine shows that the turbine shroud is typically forced towards the rotor, as the pressure behind the shroud is greater than that within the rotor passage. This sustained pressure and high temperature leads to creep effects that may ultimately cause the rotor to rub catastrophically on the shroud. By optimally sizing the bellows, the force acting through the nozzle (the gap clamping force) may be designed to balance the pressure forces acting to push the shroud into the rotor.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
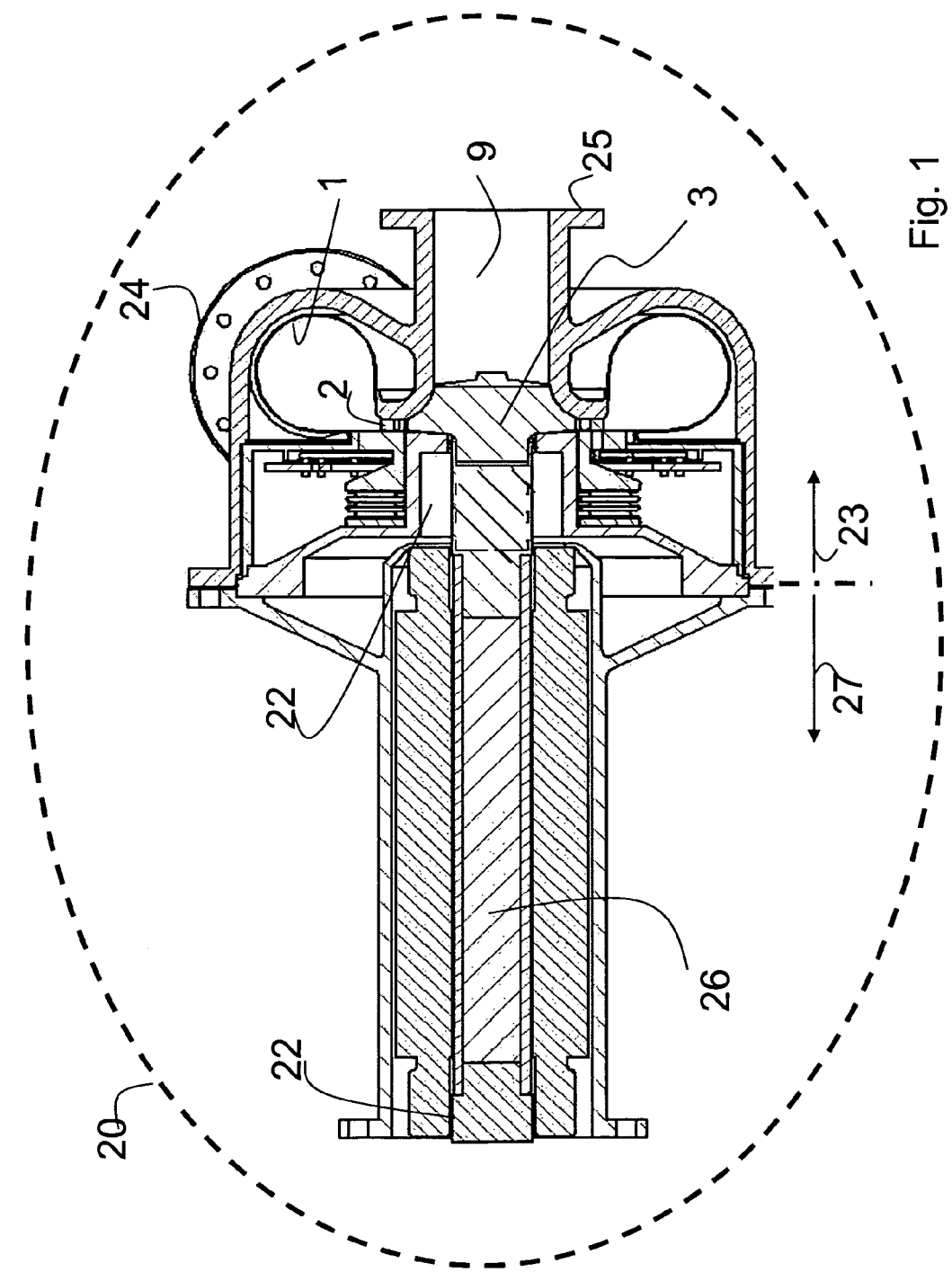
FIG. 1 depicts a turbo-alternator in accordance with an exemplary embodiment of the invention.

FIG. 1 depicts a turbomachine 20, which represents one possible embodiment of the invention. In the depicted embodiment, the device 20 is a turbo-alternator, although it will be recognized by those skilled in the art that the present invention may be adapted to other types of generators and turbomachines. The turbomachine 20 includes a gas turbine section 23 and an alternator or generator section 24, combined on a common shaft/bearing system 22. A practical use for this preferred embodiment device is to convert the energy from expanding gas to electrical power. High-temperature, high-pressure gas enters through an inlet flange 27, flows circumferentially around a turbine scroll 1, and enters a nozzle section 2 of the turbine stage 23. Accelerating through the nozzle 2 with a tangential vector, the gas enters a rotating turbine rotor 3. The velocity vector, the mass flow rate, as well as intensive state properties such as temperature and pressure, influence the potential energy converted to shaft power. The lower pressure and temperature gas exits the turbine section 23 at a conduit 9 through a flange 25. Electrical power converted by the alternator 26 may be connected to the load with conventional wiring.

Figure 2:
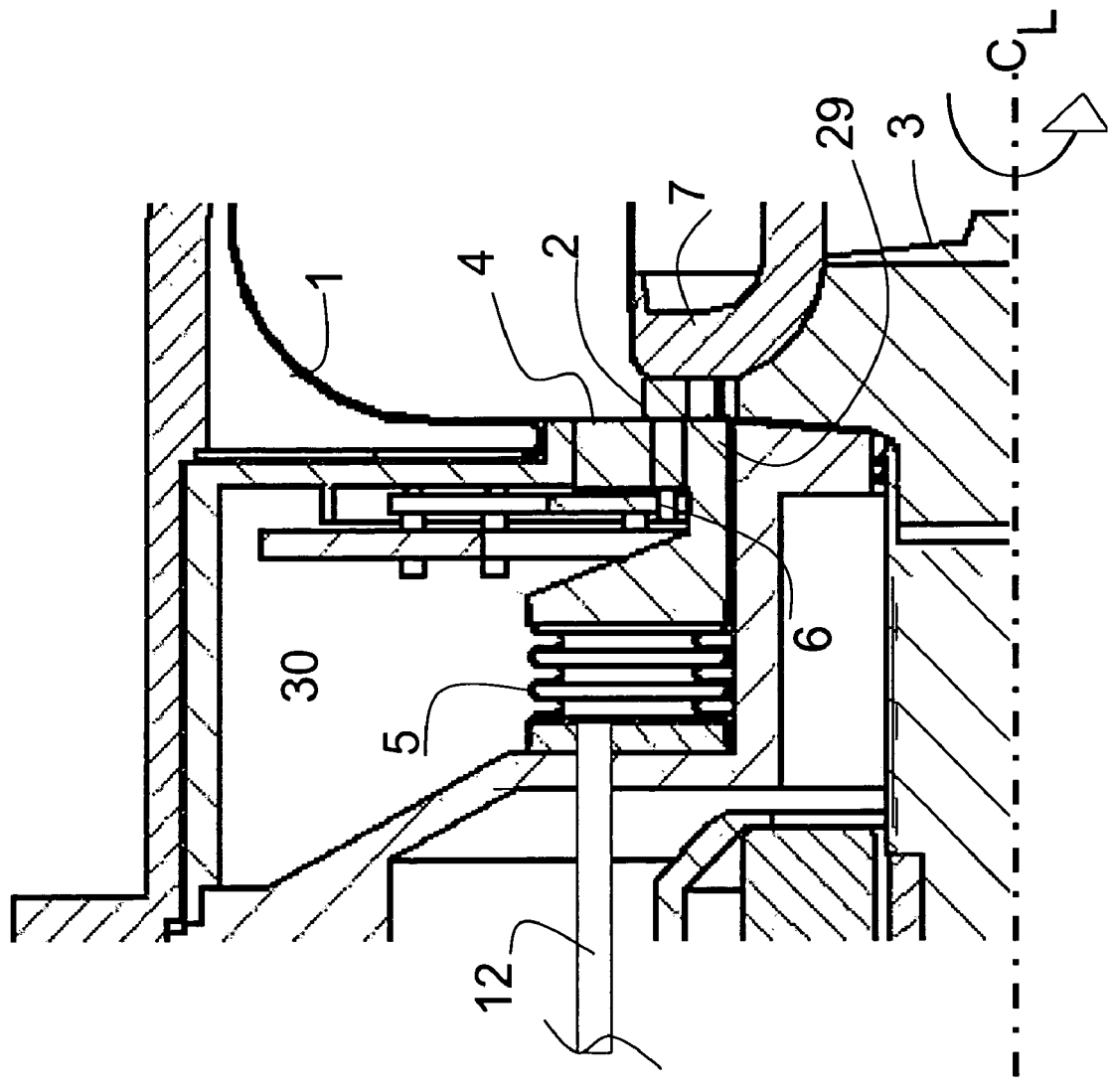
FIGS. 2 and 3 are enlarged views illustrating the bellows, nozzle pivot rod, and the annular sliding back-wall elements of the embodiment depicted in FIG. 1.

FIG. 2 provides a close-up detail, depicting the nozzle 2, which is a circumferential array of vanes surrounding the rotor 3. The vanes are angled to direct the flow into the rotor 3 with a high degree of tangency. The number of vanes in the nozzle typically varies from 11 to 19 for small turbo machines, although other numbers are also contemplated. Each nozzle is attached, e.g., integrally attached, to a rod 6 that is driven by a linkage device, represented by element 11. The linkage device 11 may be any mechanical linkage for transforming linear to rotational motion or for otherwise effecting rotational movement of the nozzles, and may include pivoting rods, a gear arrangement, or the like. For example, in an alternative embodiment (not shown) the linkage device may include a solar gear engaging a plurality of planetary gears, each engaging one of the rods 6. The linkage device 11 may be located on either side of a bellows device 5. The bellows 5 may be an annular design or, alternatively, a series of two or more discrete cylindrical bellows units 5 situated symmetrically around the nozzle 2. The bellows 5 is secured, e.g., welded to the annular element 40 that extends axially to the back wall 4 of the nozzle passage 2. The annular back-wall 4 is a ring designed with ample radial clearance so as to permit axial movement of the back wall 4 along a cylindrical surface 29. The relative pressure within the bellows 5 affects the axial movement of the annular back-wall 4.

Figure 3:
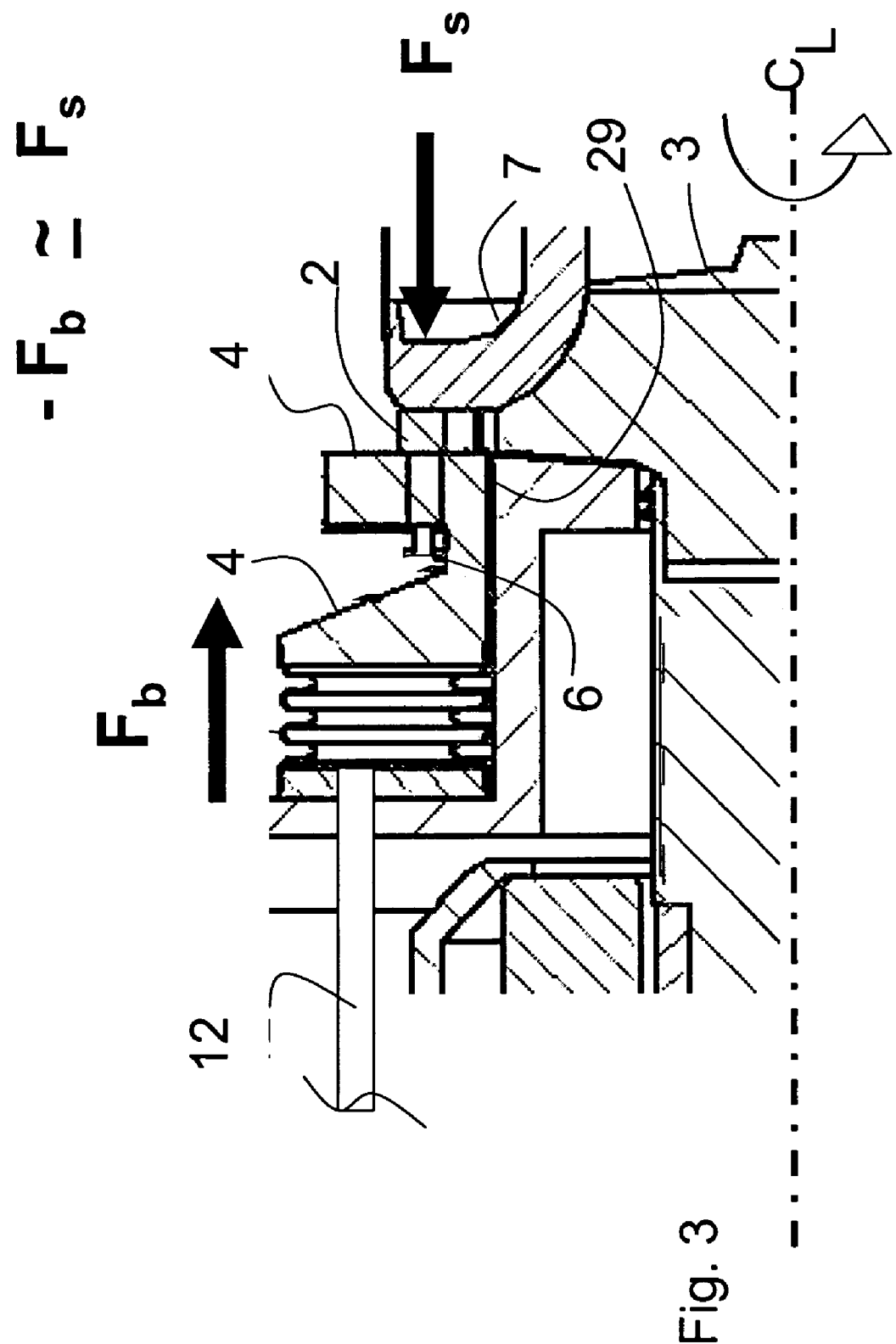

FIG. 3 shows an isolated view of the bellows 5, nozzle pivot rod 6, and the annular sliding back-wall element 4, with the mechanism for capturing and rotating the rods 6 removed for ease of exposition. The bellows piston force, Fb, acts through the sliding annular element 4 pushing the nozzle vanes 2 into the shroud 7. When properly sized, the bellow force Fb, is nominally approximately equal to the force, Fs, resulting from the pressure of the turbine inlet fluid multiplied by the projected area of the shroud 7.

Figure 4:
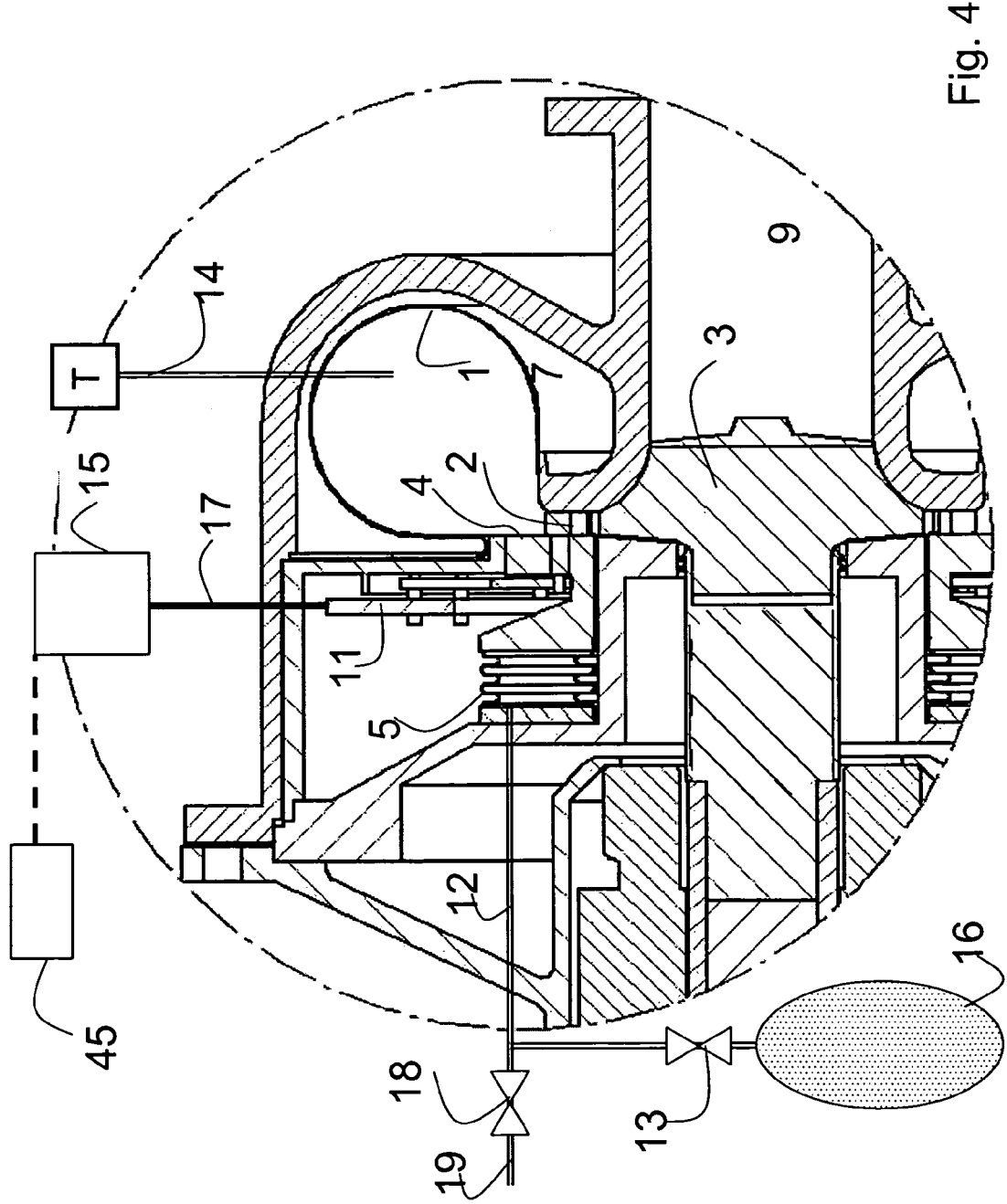
FIG. 4 depicts an exemplary mechanism for rotation of the nozzle vanes array.

In FIG. 4, a push-rod 17 actuates the linkage 11 to cause the rotation of the array of nozzle vanes 2. A linear stepper motor 15 provides the force to push the rod 17, move linkage 11, and rotate the array of nozzle vanes 2. Many practical mechanisms for interconnecting an electronic actuator, such as the linear stepper motor 15, and a slow-moving rotary device are known by those skilled in the art of mechanical design.

Conduits 12 and 19, and valves 13 and 18, are used in conjunction to provide pressurization or venting of the internal space 36 (see FIG. 5) defined within the bellows 5. The pressure used for the process is preferably obtained from the turbine system supply pressure 16, since it is naturally above that in the nozzle 2 passages. Due to the accelerating flow of gas through the nozzle passages, the static pressure is substantially depressed on the flow side of back-wall element 4, relative to that of the supply pressure 16. However, as an alternative, the supply 16 may be maintained by an auxiliary source not in common with the turbine supply. When supplied with pressure from source 16, the bellows 5 exerts a piston load acting through the movable turbine back-wall 4, thereby clamping the nozzle 2 between the back-wall 4 and the stationary shroud 7. When operating conditions warrant a nozzle position change, air pressure is vented through the valve 18 and conduit 19, thus causing the bellows 5 and the nozzle back-wall 4 to retract. This movement frees the nozzle vane from its clamping force and allows unrestricted rotation via the push rod 6 and associated linkage or gear mechanism 11. Once the stepper motor 15 has completed the programmed movement, the solenoid valve 18 is closed and the solenoid valve 13 opens to re-pressurize the bellows 5 and push the movable back-wall 4 to its clamped position.

Figure 5:
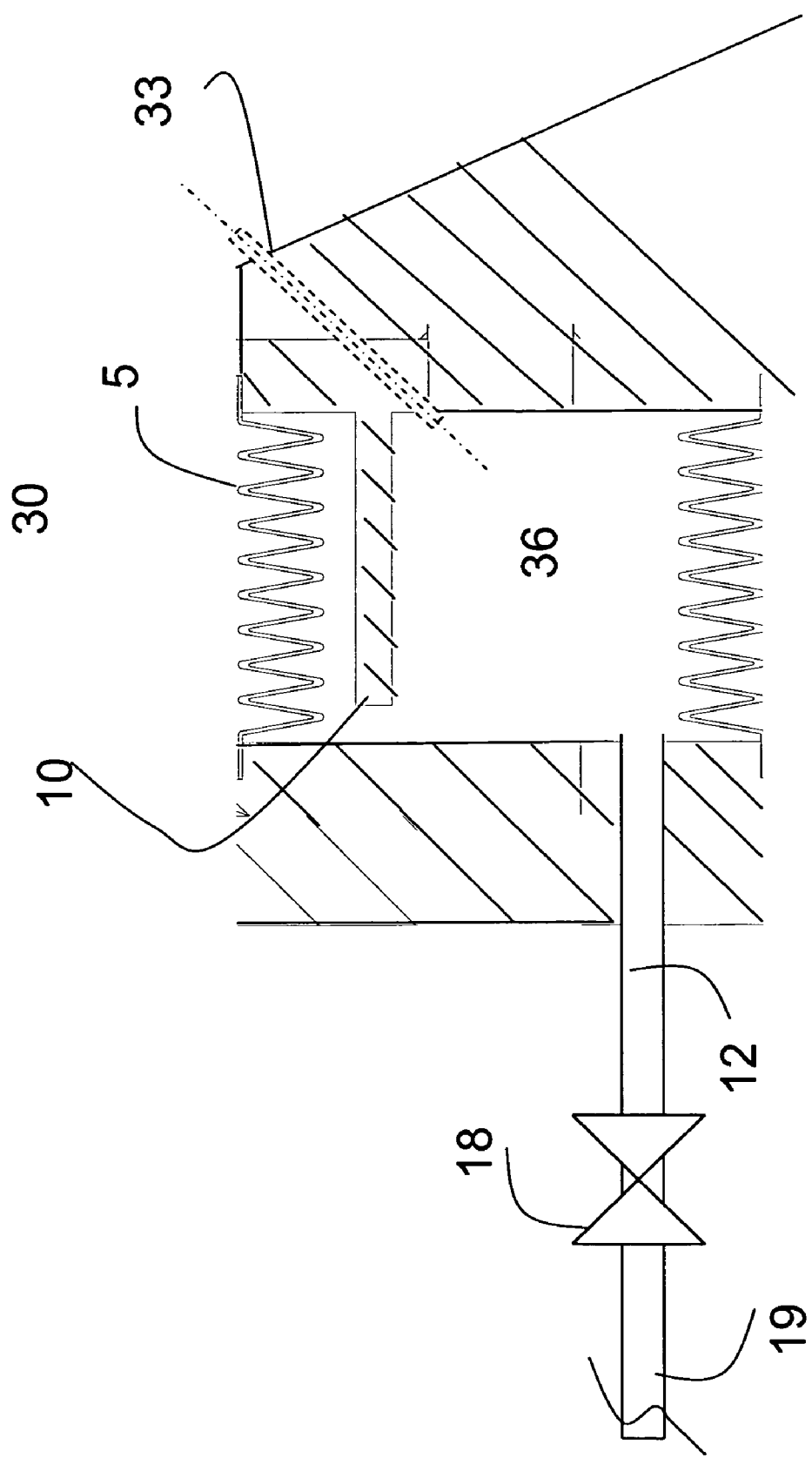
FIG. 5 depicts an alternative method for affecting the bellows movement.

An alternative method for affecting the bellows 5 movement is shown in FIG. 5. An elevated pressure in a cavity 30 communicates with the inner volume 36 of the bellows 5 via a small port 33. This port operates on the principle of a hydraulic or pneumatic snubber. When valve 18 is opened and gas is permitted to escape through conduit 19, the pressure within the bellows 5 drops. The hysteresis in the circuit from the high pressure cavity 30, the interior of the bellows 5, and the low pressure sink (possibly ambient) is controlled by the relative flow resistance of the snubber port 33, and that through valve 18 and conduit 19. For a relatively small snubber port 33, the bellows interior pressure will drop when valve 18 is opened, permitting free movement of nozzle vanes 2. The linear contraction of the bellows 5 may be limited an internal stop member 10, such as a pin or the like, providing a passive stop as the pressure within the cavity 36 drops. This pin 10 may be sized to limit the clearance gap to a value that is optimal or suitable for permitting free movement of the nozzle vane 2 in the passage. Upon closing valve 18, the bellows 5 reinflates, gradually applying the clamping force to the nozzle vanes. The snubber port 33 may be employed to passively manage gradual reinflation of the bellows, thus permitting the use of a simple on/off single point solenoid control to the vent bellows.

Figure 6:
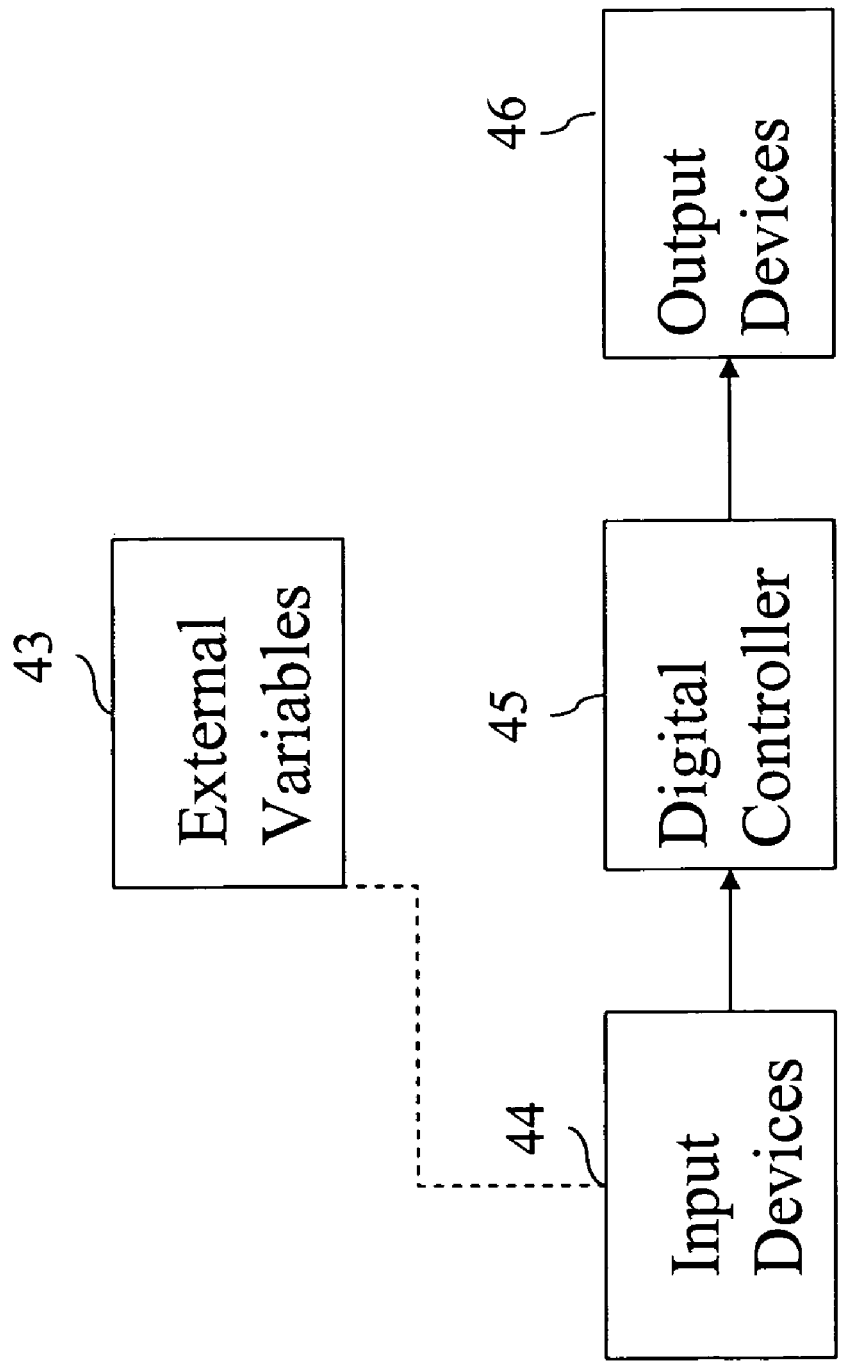
FIG. 6 is a block diagram illustrating the relationship between the external variables, the input signals, the output devices, and the programmable controller.

In a practical application, the need to change the turbine nozzle position is dictated by external variables, such as a demand for power, changing input from the fuel source, a natural variation in the supply pressure, and so forth. FIG. 6 illustrates the relationship between external variables 43, input signals 44, output devices 46, and a controller 45, such as a digital microprocessor or microcontroller, or other programmable controller. In a preferred embodiment, the primary input signal may be a temperature signal from a turbine inlet temperature-sensing device 14 (see FIG. 4). In applications where the gas temperature may be too high to obtain long-term reliable temperature measurement, the temperature-sensing device 14 may be located at a cooler location, such as the turbine exit 9 (see FIG. 4). By employing an algorithm that includes measurement of the upstream and downstream pressures, the turbine inlet temperature may alternatively be determined or calculated by inference based on the outlet temperature.

Figure 7:
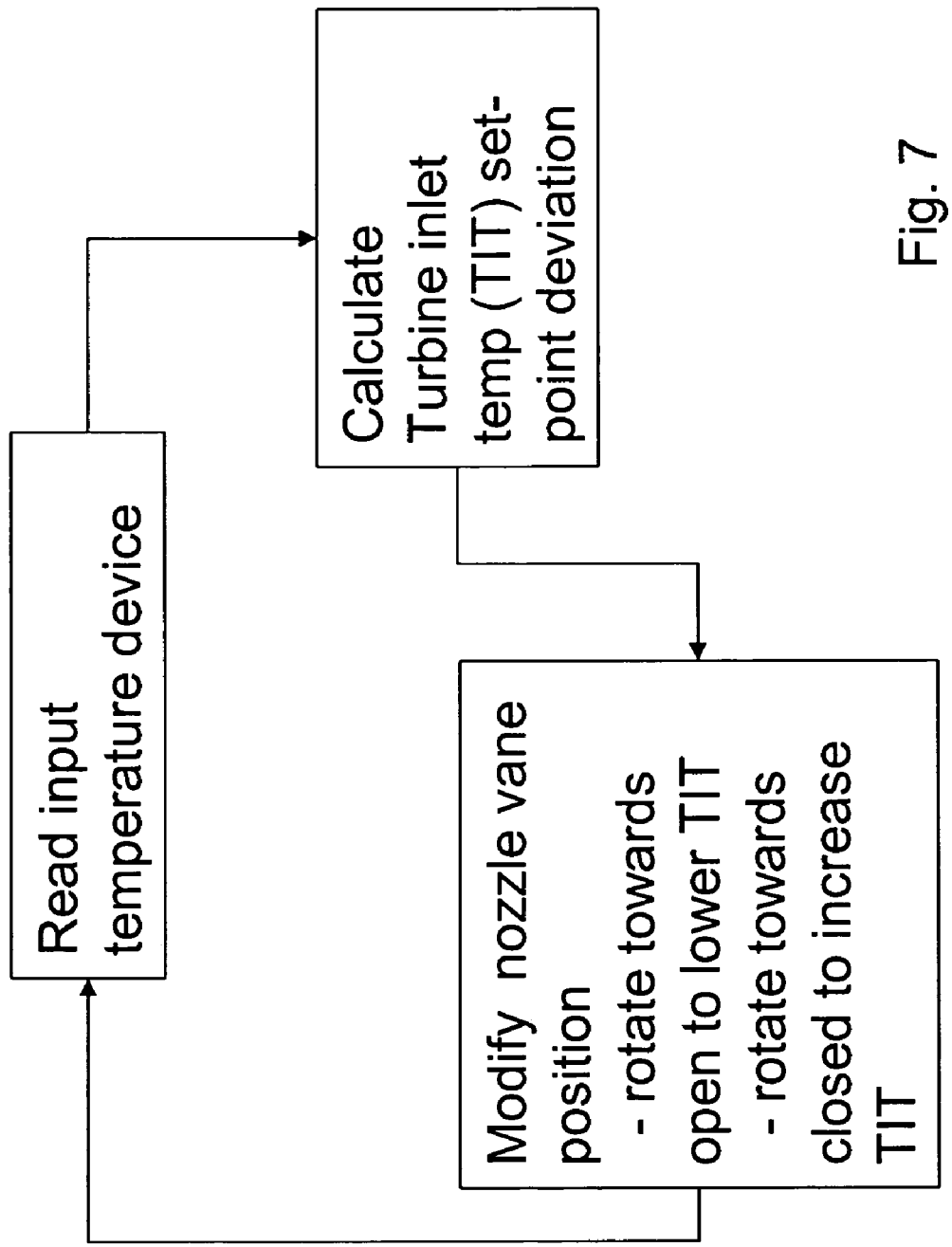
FIG. 7 is a flow diagram illustrating a method of control for the variable position nozzle according to an exemplary embodiment.

FIG. 7 illustrates a method of controlling the variable position nozzle under conditions where solar is the only heat source. A change in either external variable, i.e., solar insolation and/or supply pressure, will cause a change in the turbine inlet temperature. Dropping temperature causes a reduction in overall efficiency, and excess flow consumption. Likewise, a rising temperature could have catastrophic results as a gas turbine generally operates near the property limits of the materials. A simplified feedback loop is shown in FIG. 7. An indication of the turbine inlet temperature (e.g., either by direct measurement or by inference as detailed above) is read into the microprocessor and compared against some predefined or preselected control set point. As used herein, the term "set point" is intended to encompass not only a discrete value, but also, an acceptable range of values. To correct the error signal when the inlet temperature sensed is outside of the preselected conditions, the variable position nozzle will perform the unclamp-rotate-reclamp sequence described above.

Figure 8:
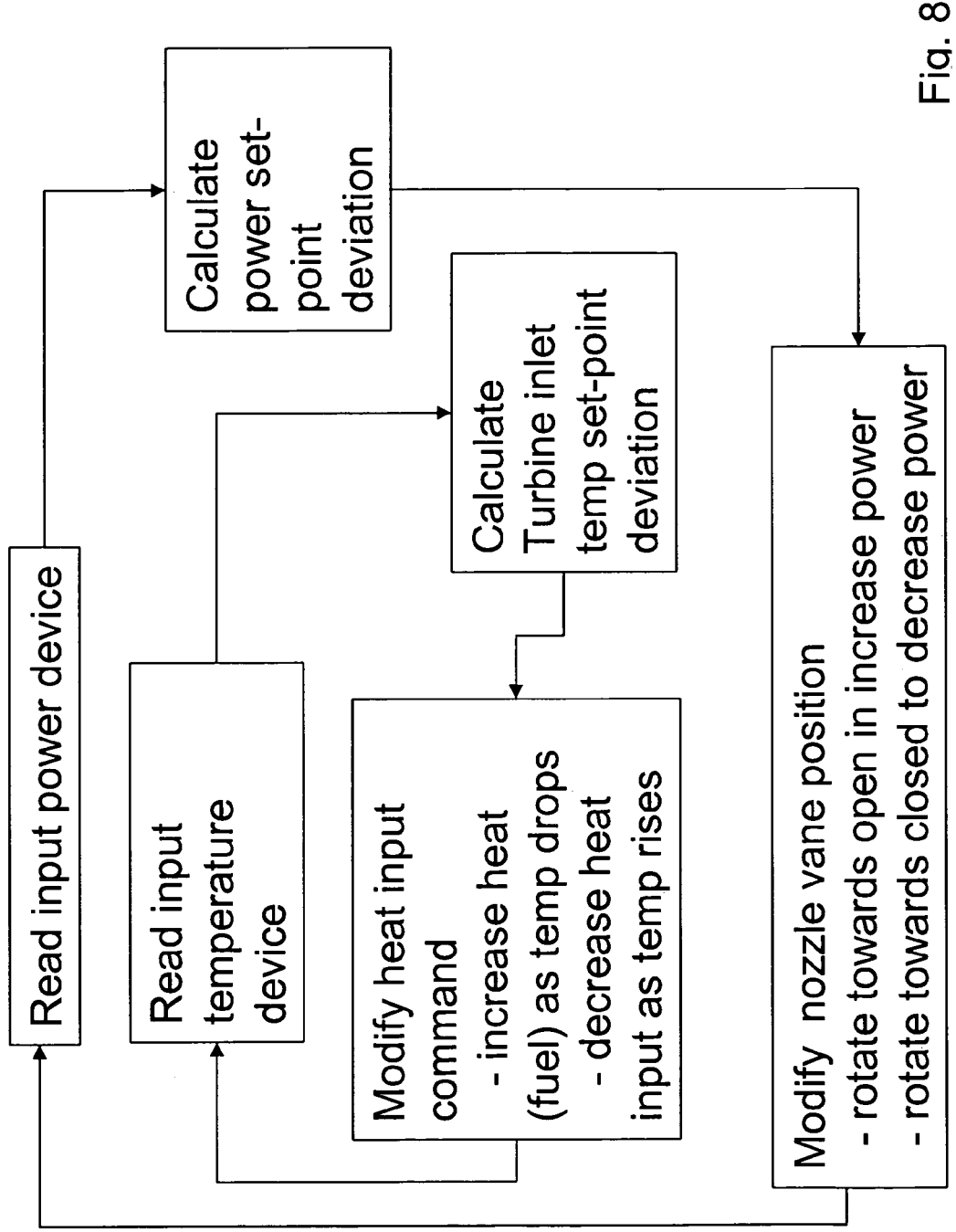
FIG. 8 is a flow diagram illustrating an exemplary operating mode for maintaining a turbine inlet temperature and power set points given changes in the external variables.

FIG. 8 describes a typical operating mode set to maintain a turbine inlet temperature set point and a power set point given changes in the external variables (e.g., system supply pressure, thermal input, and operator demand). In embodiments wherein solar energy is employed as a heat source, maintaining a power set point additionally requires control over a supplemental (hybrid) fuel source, since under solar-only operation, the power is a function of the solar availability. In FIG. 8 the temperature response loop is represented as the inner loop in the diagram and preferably operated with a faster time constant that the outer loop. In this example the inner loop works to maintain a turbine inlet temperature set point as described above by asserting control over the heat source, such as a fuel control valve. In the event the inlet temperature exceeds the preselected set point, the heat input is decreased. In the event that the temperature is less than the temperature set point, the heat input is increased.

The depicted outer loop, operating with a slower time constant works to control the flow through the turbomachine to achieve the power set point. Comparing the power measurement from the input device to the set point, the microprocessor commands the actuating system to rotate the vane mechanism towards the closing (more tangential) position when the sensed power value is below the preselected set point and towards the more open, or radial position when the measured power is above the preselected set point. This nested loop arrangement is stable and properly constrained as long as the nozzle vanes operate within their physical limits of rotation, between maximum open and maximum closed positions.

Figure 9:
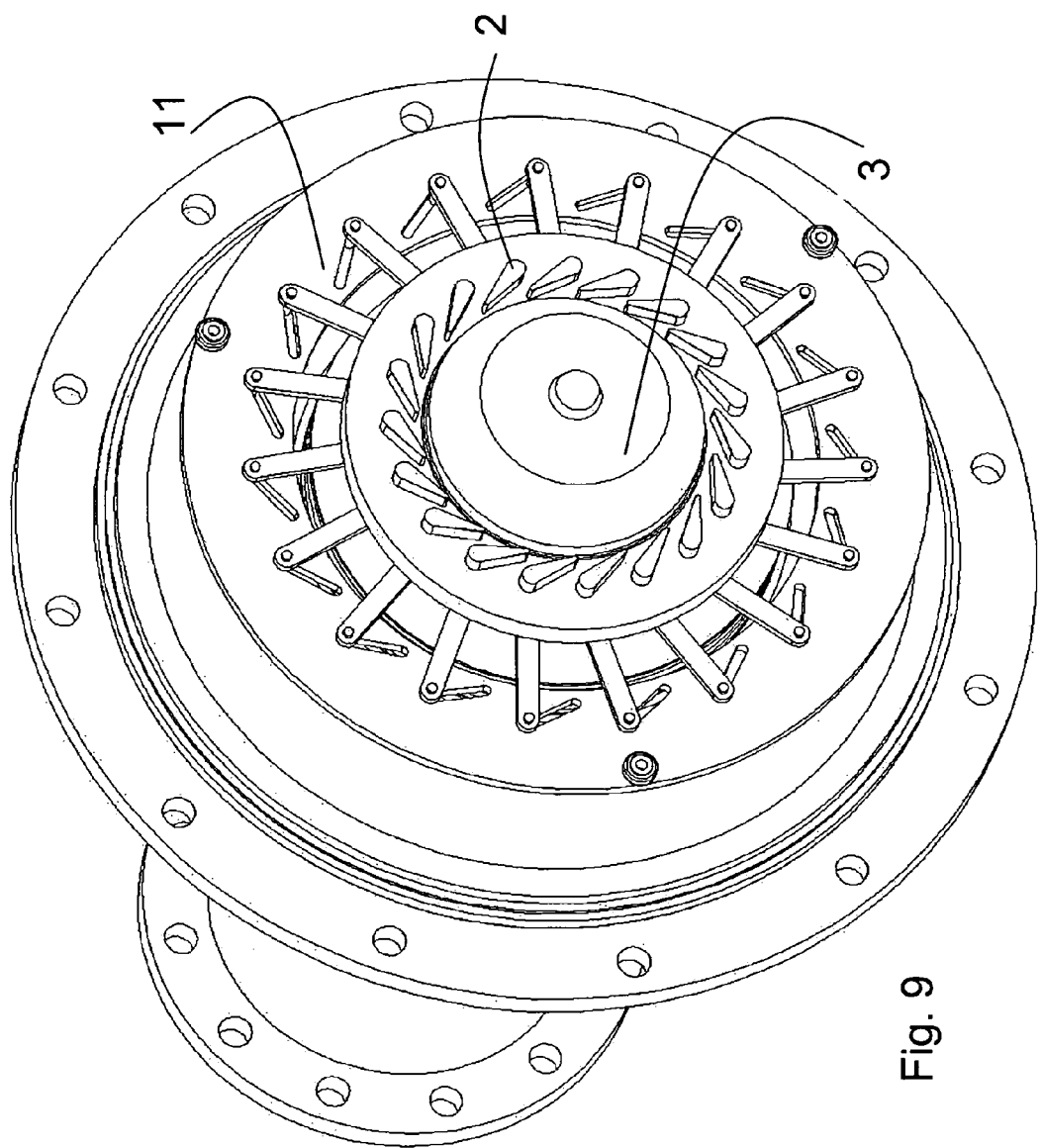
FIG. 9 is a pictorial depiction of the nozzle vanes, vane rotating mechanism, and the turbine rotor according to an exemplary embodiment of the present invention.

FIG. 9 shows an isometric view of the nozzle vanes 2, the vane rotating mechanism 11, and the turbine rotor 3. The turbine is shown as having a bladeless rotor for ease of exposition.

In certain embodiments, the variable position nozzle vane system may permit free movement of the vanes in a high temperature environment prone to large thermal strain. In yet other embodiments, the variable position nozzle vane system may permit relaxation of machining tolerances in the nozzle area, which may result in manufacturing cost savings. In further embodiments, a positively sealed nozzle vane may be provided, with top and bottom surface maintained in a pneumatically clamped position to prevent gas leakage, which may raise the efficiency of the variable geometry turbine stage. In yet other aspects, the bellows diameter may be optimally sized so as to provide an axial thrust acting through the nozzle that serves to counteract the natural forces on the shroud that tend to close (creep) the shroud into the turbine rotor.

The invention has been described with reference to the preferred embodiments. Modifications and alterations will occur to others upon a reading and understanding of the preceding disclosure herein, whereby it is to be distinctly understood that the foregoing descriptive matter is to be interpreted merely as illustrative of the invention and not as a limitation.

Having thus described the preferred embodiments, the invention is now claimed to be:

1. A turbomachine for extracting mechanical energy from a compressed gas, comprising:
   a rotor portion including a rotor having a plurality of rotor blades;
   a nozzle portion having a plurality of rotatable nozzle vanes, a stationary shroud, and a movable wall, said movable mall having a first, higher pressure side and a second, lower pressure side opposite the first side;
   one or more pneumatic bellows, each of said one or more pneumatic bellows defining an internal cavity for selectively varying a pressure exerted on the lower pressure side of the movable wall;
   each of said one or more bellows including an inlet for selectively increasing pressure within said internal cavity for urging the movable wall to a closed position wherein the nozzle vanes are clamped between the movable wall and the stationary shroud; and
   each of said one or more bellows including an outlet for selectively reducing pressure within said internal cavity for retracting the movable wall to an open position permitting rotation of the nozzle vanes.

2. The turbomachine of claim 1, further comprising an apparatus for converting mechanical energy into electrical energy.

3. The turbomachine of claim 2, wherein said apparatus for converting mechanical energy into electrical energy is a generator.

4. The turbomachine of claim 3, wherein said generator is an alternator.

5. The turbomachine of claim 1, wherein said inlet is coupled to a source of pressurized gas.

6. The turbomachine of claim 1, wherein said inlet is a snubber port passing through said movable wall.

7. The turbomachine of claim 1, wherein the compressed gas is air.

8. The turbomachine of claim 1, wherein said one or more pneumatic bellows are configured to exert a force Fb on the stationary shroud through the back wall and nozzle vanes when the back wall is urged to said closed position, which force Fb is approximately equal in magnitude and opposite in direction to a force Fs, which is equal to an inlet pressure of said compressed gas entering the turbomachine multiplied by the projected area of the stationary shroud.

9. A nozzle vane apparatus for use with a turbine of a radial flow type or a mixed axial and radial flow type, said apparatus comprising:
   a multi-vane air-foil including a plurality of nozzle vanes rotatably coupled to a sliding annular back wall;
   a pressure-actuated bellows coupled to said sliding annular back wall for effecting sliding movement of said annular back wall;
   a conduit used to control an internal pressure of said bellows;
   said sliding back wall defining a portion of the nozzle surface and serving to clamp the nozzle vanes to a static turbine shroud wall; and
   each of said plurality of nozzle vanes coupled to a movable rod penetrating said annular back wall; and
   a linkage device coupled to said movable rods for effecting simultaneous rotation of the vanes.

10. The apparatus of claim 9, further comprising:
    a sensor for determining turbine inlet temperature;
    a first controller coupled to the sensor for providing closed loop control over turbine inlet temperature by commanding discrete open and closing movements of the nozzle; and
    a valve coupled to said conduit for selectively fluidically coupling an interior of said bellows to a source of pressurized air.

11. The apparatus of claim 10, further comprising:
    a fuel control valve for the induction of fuel into a combustion device located upstream of the turbine; and a second controller coupled to the fuel control valve for controlling the fuel valve so as to maintain a preselected power set point.

12. The apparatus of claim 9, further comprising:
an internal stop mounted within an interior portion of said bellows.

13. The apparatus of claim 9, further comprising;
said bellows comprising an annular bellows having an internal diameter and an external diameter, wherein the internal and external diameters of the bellows are selected to produce a force through the annular sliding back wall and nozzle vanes so as to result in a force approximately equal and opposite to that created by the gas pressure on the outside of the static turbine shroud wall during operation.

14. A method for controlling the flow of gas in a turbomachine of a type having a rotor portion including a rotor having a plurality of rotor blades and a nozzle portion having a plurality of rotatable nozzle vanes, a stationary shroud, and a movable wall, said movable wall having a first, higher pressure side and a second, lower pressure side opposite the first side, said method comprising:
providing one or more pneumatic bellows, each of which defining an internal cavity which is in fluid communication with the lower pressure side of the movable wall;
determining whether or not to change the position of said rotatable nozzle vanes;
if said position of the nozzle vanes is not to be changed, increasing pressure within said internal cavity for urging the movable wall to a closed position wherein the nozzle vanes are clamped between the movable wall and the stationary shroud; and
if said position of the nozzle vanes is to be changed, reducing pressure within said internal cavity for retracting the movable wall to an open position permitting rotation of the nozzle vanes.

15. The method of claim 14, further comprising:
sensing an inlet temperature of the turbomachine;
comparing the inlet temperature to a preselected temperature or temperature range;
if the inlet temperature is outside the preselected temperature or temperature range:
decreasing pressure within said internal cavity to cause retraction of the movable wall to an open position;
rotating the nozzle vanes towards a more open nozzle position if the inlet temperature is greater than the preselected temperature or temperature range;
rotating the nozzle vanes towards a more closed nozzle position if the inlet temperature is less than the preselected temperature or temperature range; and
increasing the pressure within the internal cavity to clamp the nozzle vanes between the movable wall and the stationary shroud.

16. The method of claim 14, further comprising:
providing a first, solar energy heat source and a second, supplemental heat source for heating said gas;
sensing an inlet temperature of the turbomachine;
comparing the inlet temperature to a preselected temperature or temperature range;
if the inlet temperature is greater than the preselected temperature or temperature range, decreasing heat input from said second, supplemental heat source;
if the inlet temperature is less than the preselected temperature or temperature range, increasing heat input from said second, supplemental heat source;
sensing a power output of the turbomachine;
comparing the sensed power output to a preselected power output or power output range;
if the power output is outside the preselected power output or power output range:
decreasing pressure within said internal cavity to cause retraction of the movable wall to an open position;
rotating the nozzle vanes towards a more closed nozzle position if the power output is greater than the preselected temperature or temperature range;
rotating the nozzle vanes towards a more open nozzle position if the power output is less than the preselected temperature or temperature range; and
increasing the pressure within the internal cavity to clamp the nozzle vanes between the movable wall and the stationary shroud.

* * * * *